United States Patent
Devi et al.

(10) Patent No.: US 9,026,077 B2
(45) Date of Patent: May 5, 2015

(54) DELAYED DELIVERY WITH BOUNDED INTERFERENCE IN A CELLULAR DATA NETWORK

(71) Applicant: International Business Machines Corporation, Armonk, NY (US)

(72) Inventors: Umamaheswari Devi, Bangalore (IN); Shivkumar Kalyanaraman, Bangalore (IN); Ravindranath Kokku, Bangalore (IN); Mukundan Madhavan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 74 days.

(21) Appl. No.: 13/854,084

(22) Filed: Mar. 30, 2013

(65) Prior Publication Data

US 2014/0295789 A1 Oct. 2, 2014

(51) Int. Cl.
*H04M 1/66* (2006.01)
*H04W 72/12* (2009.01)
*H04M 15/00* (2006.01)
*H04W 4/24* (2009.01)

(52) U.S. Cl.
CPC .......... *H04W 72/1263* (2013.01); *H04M 15/42* (2013.01); *H04W 4/24* (2013.01)

(58) Field of Classification Search
None
See application file for complete search history.

(56) References Cited

U.S. PATENT DOCUMENTS

| | | | |
|---|---|---|---|
| 5,878,351 A | 3/1999 | Alanara et al. | |
| 7,747,300 B1* | 6/2010 | de Barros | 455/703 |
| 8,019,886 B2 | 9/2011 | Harrang et al. | |
| 2003/0003906 A1* | 1/2003 | Demers et al. | 455/424 |
| 2003/0045273 A1 | 3/2003 | Pyhalammi et al. | |
| 2005/0188089 A1* | 8/2005 | Lichtenstein et al. | 709/226 |
| 2006/0198299 A1* | 9/2006 | Brzezinski et al. | 370/229 |
| 2008/0153523 A1 | 6/2008 | Febonio et al. | |
| 2008/0317037 A1* | 12/2008 | Vogl et al. | 370/395.4 |
| 2010/0011056 A1 | 1/2010 | Bryson et al. | |
| 2010/0162318 A1* | 6/2010 | Smith | 725/50 |
| 2010/0198943 A1 | 8/2010 | Harrang et al. | |
| 2013/0107716 A1* | 5/2013 | Volpe et al. | 370/235 |

FOREIGN PATENT DOCUMENTS

EP 1069736 B1 9/2012

OTHER PUBLICATIONS

Lee, Joohyun et al., "Economics WiFi Offloading: Trading Delay for Cellular Capacity," arXiv:1207.6607v1 [cs.NI], Jul. 27, 2012, 14 pages, Cornell University Library, Ithaca, New York, USA.

(Continued)

*Primary Examiner* — Charles Appiah
*Assistant Examiner* — Margaret G Mastrodonato
(74) *Attorney, Agent, or Firm* — Ference & Associates LLC

(57) ABSTRACT

Methods and arrangements for undertaking delayed delivery of digital content. At least one request for transmission of digital content is received from a client device. There is estimated a usable bandwidth for delivery of the digital content during a predetermined time period. There is offered to the client device two or more delivery schedules for delayed digital content delivery during the predetermined time period. Other variants and embodiments are broadly contemplated herein.

10 Claims, 10 Drawing Sheets

(56) References Cited

OTHER PUBLICATIONS

Paul, Utpal et al., "Opportunistic Traffic Scheduling in Cellular Data Networks," 2012, 9 pages. Copy can be found at http://www.bell-labs.com/user/mbuddhikot/psdocs/OpportunisticTraffic-Celliular-DySPAN2012.pdf. Accessed Mar. 21, 2013.

Liu, Xiao Huan et al., "NGL02-3: Price-Sensitive Application Adaptation in Deadline-Based Networks," Global Telecommunications Conference, GLOBECOM'06, San Francisco, California, USA, Nov. 27-Dec. 1, 2006, Abstract only, 2 pages, IEEEXplore.

Venkataramani, Arun et al., "TCP Nice: A Mechanism for Background Transfers," 5th Symposium on Operating Systems Design and Implementation, OSDI'02, Boston, Massachusetts, USA, Dec. 9-11, 2002, pp. 329-343, USENIX Association.

Kuzmanovic, Aleksandar et al., "TCP-LP: Low-Priority Service via End-Point Congestion Control," IEEE/ACM Transactions on Networking, Aug. 2006, pp. 739-752, vol. 14, No. 4, IEEE, Washington, DC, USA.

Kokku, Ravi et al., "A Multipath Background Network Architecture," IEEE INFOCOM 2007 Proceedings of the 26th Annual IEEE Conference on Computer Communications, Anchorage, Alaska, USA, May 6-12, 2007, pp. 1352-1360, IEEE, Washington, DC, USA.

Key, Peter et al., "Emulating Low-priority Transport at the Application Layer: A Background Transfer Service," SIGMETRICS/Performance'04, New York, New York, USA, Jun. 12-16, 2004, pp. 118-129, ACM Digital Library.

Microsoft Corporation, "Background Intelligent Transfer Service (BITS) Peer-Caching: Peer Authentication Protocol," Jan. 18, 2013, 29 pages, Microsoft Corporation, San Francisco, California, USA.

\* cited by examiner

DELAYED DELIVERY WITH BOUNDED INTERFERENCE IN A CELLULAR DATA NETWORK

BACKGROUND

The proliferation of smart mobile devices is leading to an unprecedented increase in mobile data traffic, but the distribution of traffic is not uniform over time. Networks often observe significant variation in utilization levels, mainly triggered by diurnal patterns of human activity; e.g., networks see more utilization during days than nights, cellular base-stations are more loaded during mornings and late evenings in residential areas, whereas base-stations near commercial areas are busy during office hours, etc. In fact, there is high variation in the throughput that a given traffic flow achieves even at short time scales of a few seconds.

As such, delivery of digital content to mobile devices over a spectrum (such as 3G spectrum) carries costs for mobile network operators, over-the-top-providers, and end users. Mobile network operators provide bandwidth for delivery of data services. Cellular networks incur significant capital and operational costs, which are increasing significantly due to the rapidly growing demand. Also, cellular wireless spectrum is a scarce and increasingly expensive resource. Consequently, it is important for the operators to extract the maximum yield out of the spectrum owned. In other words, it is important to minimize the times during which the network remains under-utilized.

Conventional solutions to the problem of reducing spectrum under-utilization have involved reducing the overall network service price, to result in cheaper subscription plans. While this might increase the adoption of services, it also ends up increasing logistical challenges and difficulties, such as increased contention during peak times, and can lead to a decrease in quality of experience (QoE).

BRIEF SUMMARY

In summary, one aspect of the invention provides an apparatus comprising: at least one processor; and a computer readable storage medium having computer readable program code embodied therewith and executable by the at least one processor, the computer readable program code comprising: computer readable program code configured to receive at least one request for transmission of digital content from a client device; computer readable program code configured to estimate a usable bandwidth for delivery of the digital content during a predetermined time period; and computer readable program code configured to offer to the client device two or more delivery schedules for delayed digital content delivery during the predetermined time period.

Another aspect of the invention provides a method comprising: utilizing at least one processor to execute computer code configured to perform the steps of: receiving at least one request for transmission of digital content from a client device; estimating a usable bandwidth for delivery of the digital content during a predetermined time period; and offering to the client device two or more delivery schedules for delayed digital content delivery during the predetermined time period.

An additional aspect of the invention provides a computer program product comprising: a computer readable storage medium having computer readable program code embodied therewith, the computer readable program code comprising: computer readable program code configured to receive at least one request for transmission of digital content from a client device; computer readable program code configured to estimate a usable bandwidth for delivery of the digital content during a predetermined time period; and computer readable program code configured to offer to the client device two or more delivery schedules for delayed digital content delivery during the predetermined time period.

A further aspect of the invention provides a method comprising: interacting with a plurality of clients to determine a time for delayed transmission of digital content; estimating usable bandwidth over a predetermined time period; and with respect to at least one client, and based on the estimated usable bandwidth: estimating delivery deadlines for delayed digital content delivery; determining pricing associated with each of the deadlines; presenting the estimated delivery deadlines and associated pricing to the at least one client; and performing at least one of: accepting from the at least one client a selection of a delivery deadline and its associated pricing; negotiating, with the at least one client, at least one newly proposed delivery deadline and associated pricing.

A further aspect of the invention provides a method comprising: (i) interacting with a plurality of clients; (ii) estimating usable bandwidth over a predetermined time period; and (iii) with respect to at least one of the clients, and based on the estimated usable bandwidth: estimating delivery deadlines for delayed digital content delivery; determining pricing associated with each of the deadlines; presenting the estimated delivery deadlines and associated pricing to the at least one client; and performing at least one of: accepting from the at least one client a selection of a delivery deadline and its associated pricing; negotiating, with the at least one client, at least one newly proposed delivery deadline and associated pricing.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
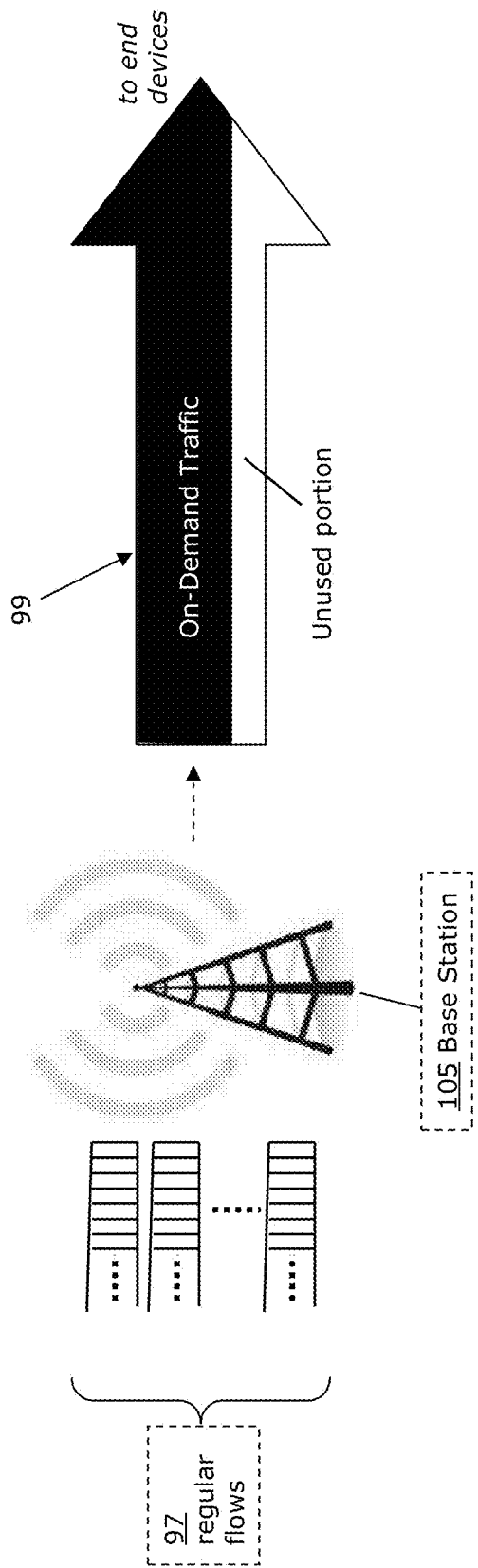
FIGS. 1 and 2 schematically illustrate components of a problem approached herein.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will now be made herebelow to FIGS. 1-8. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 10. In accordance with an example embodiment, most if not all of the process steps, components and outputs discussed with respect to FIGS. 1-8 can be performed or utilized by way of a processing unit or units and system memory such as those indicated, respectively, at 16' and 28' in FIG. 10, whether on a server computer, a client computer, a node computer in a distributed network, or any combination thereof.

Figure 6:
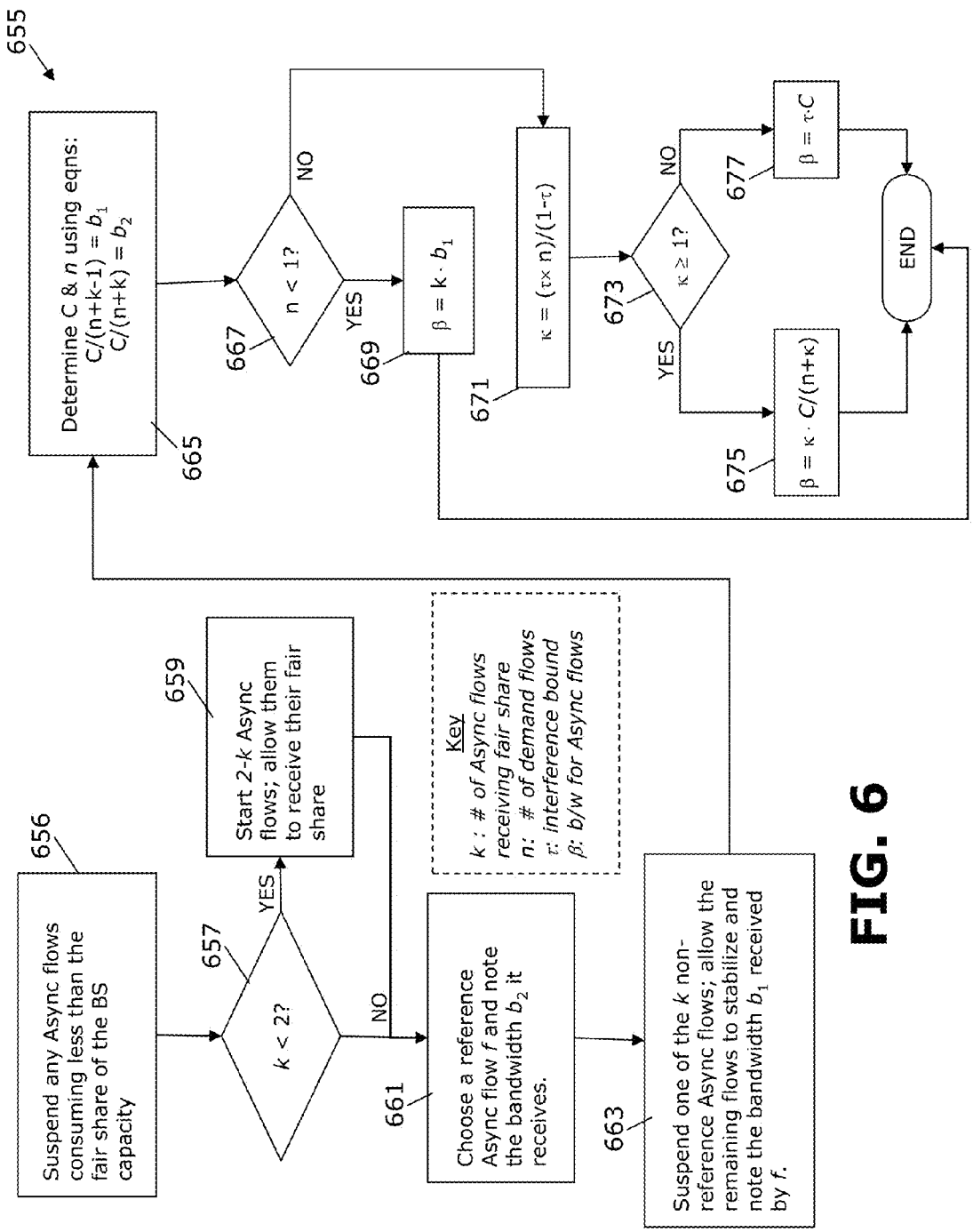
FIG. 6 schematically illustrates a more detailed view of an estimation phase.
Figure 7:
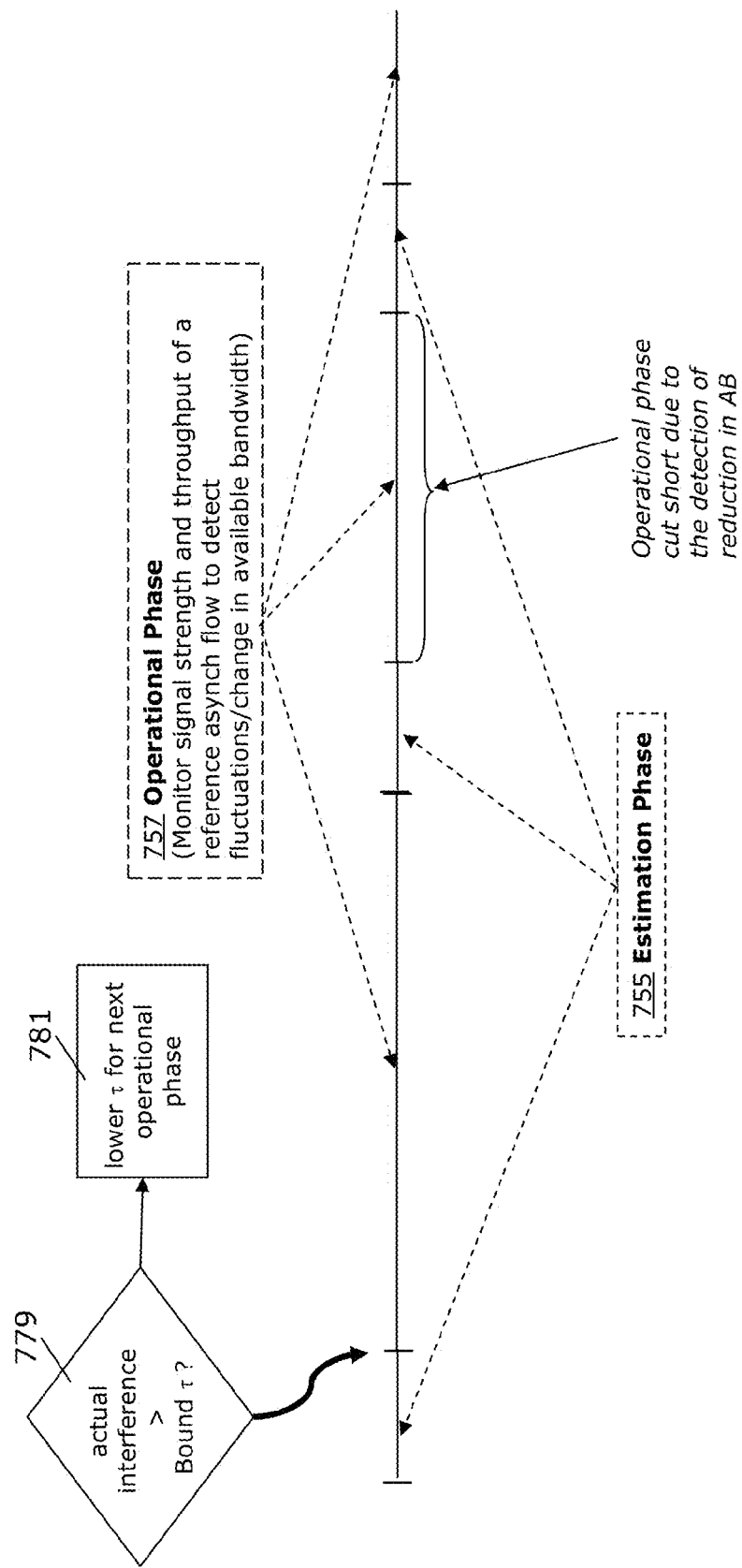
FIG. 7 schematically illustrates a process for ensuring a bound on interference.
Figure 8:
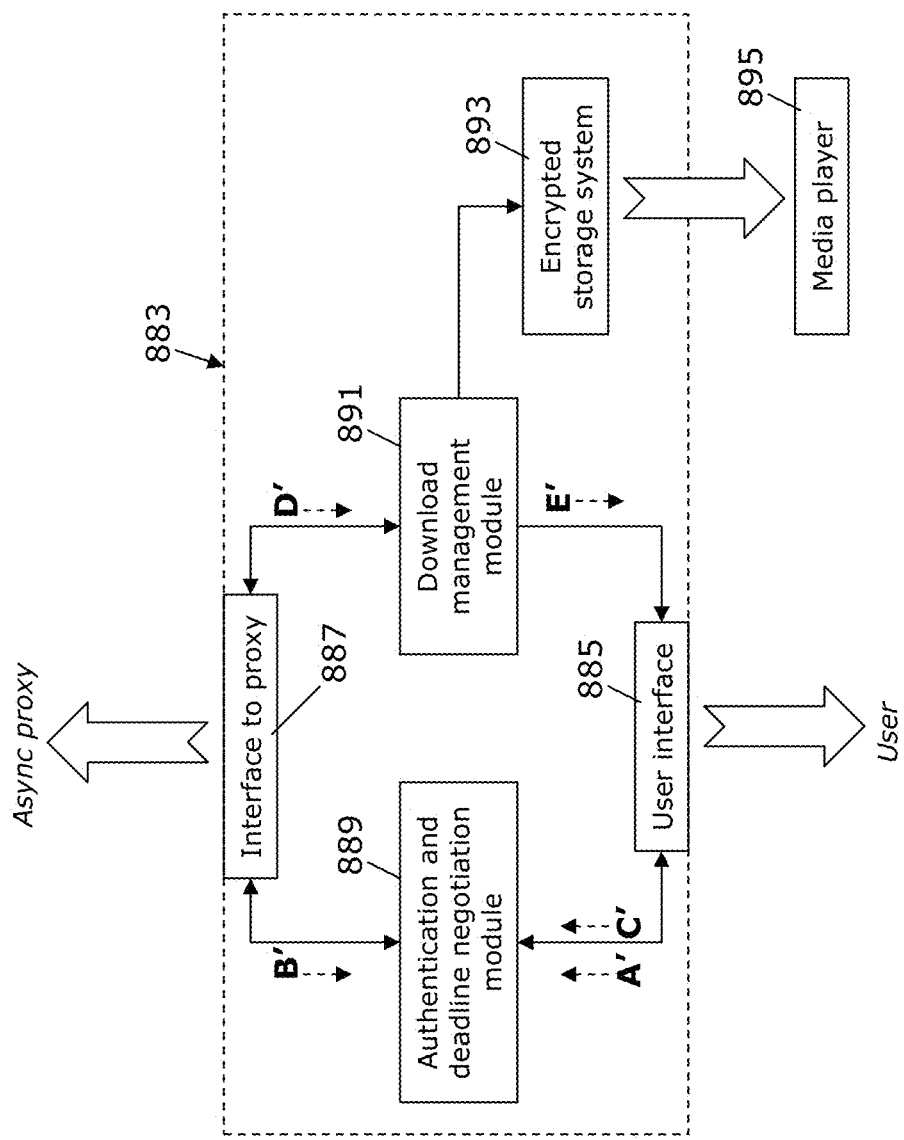
FIG. 8 schematically illustrates a delayed delivery client.

To facilitate easier reference, in advancing from FIG. 1 to and through FIG. 8, a reference numeral is advanced by a multiple of 100 in indicating a substantially similar or analogous component or element with respect to at least one component or element found in at least one earlier figure among FIGS. 1-8.

In accordance with at least one embodiment of the invention, there are broadly contemplated herein systems and methods for network-controlled delayed-delivery of data to users such that data are transferred opportunistically during periods of low spectrum demand.

As such, in accordance with at least one embodiment of the invention, it is recognized that during peak times of delivering digital content, bandwidth may be depleted in a way to cause unintended delays and thus decrease the user's quality of experience. Such delays also erode the user's quality of experience for over-the-top programming, thus eroding the user's confidence in the mobile network operator and the over-top-provider's services. Moreover, during off-peak demand times, bandwidth may go unused, and typically there is no way to recover the unused bandwidth for future use. Thus, the lost bandwidth decreases the potential profits of the mobile network provider. Thus, it has become readily apparent that conventional systems and methods have fallen short in providing a desirably efficient use of operator spectrum.

In accordance with at least one embodiment of the invention, less-congested time periods are thus exploited for end-to-end services by way of increasing overall spectrum utilization and to meet superior QoE expectations. In this vein, there are broadly contemplated herein systems and methods for a network-controlled delayed delivery of data to users such that data are transferred during periods of low spectrum demand.

Accordingly, in accordance with at least one embodiment of the invention, it is recognized that mobile device users can be offered an opportunity for delayed delivery times in order to spread out bandwidth usage on 3G networks. Users who request delivery of data objects such as videos may be given the option of accepting delayed delivery in exchange for lower prices of delivery.

Figure 2:
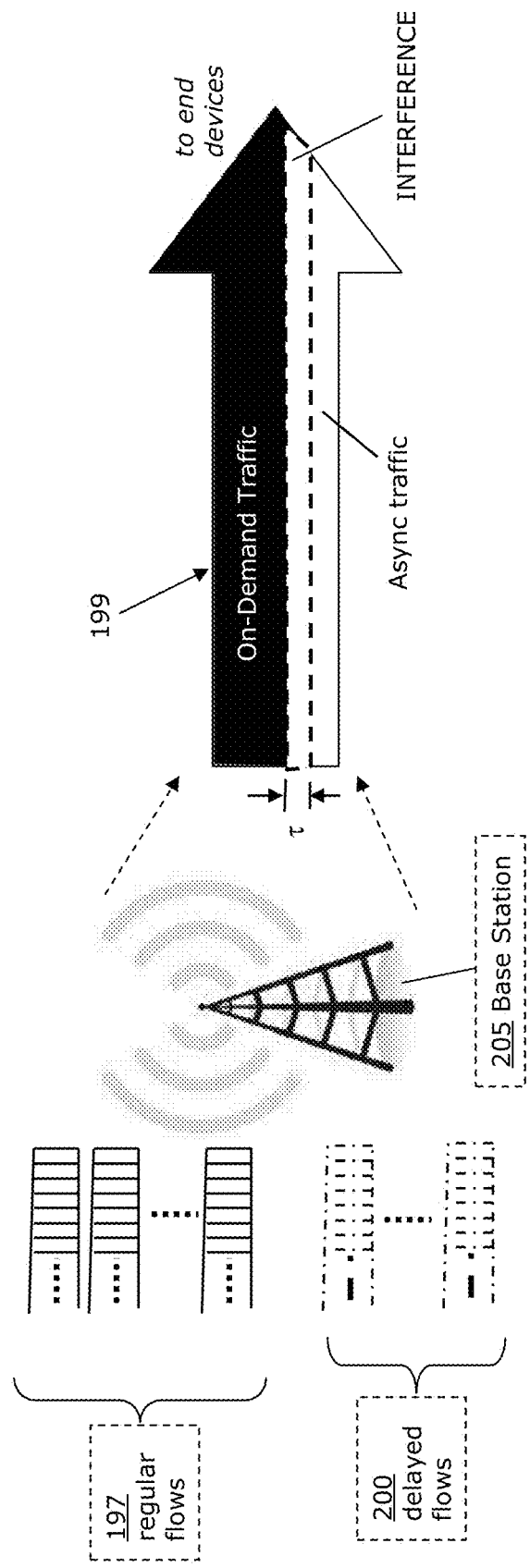

As such, FIGS. 1 and 2 schematically illustrate components of a problem approached in accordance with at least one embodiment of the invention. As shown in FIG. 1, at any given time, with regular digital content flows 97 processed via a base station 105, on-demand traffic (i.e., traffic for real-time or virtually immediate delivery of digital content) occupies a certain portion of the available spectrum (e.g., 3G spectrum) 99, with or without some portion unused. The broad goal of delayed delivery, herein also referred to as asynchronous or "Async" delivery, is to utilize this unused bandwidth to transmit as much of the delayed traffic as possible. As can be appreciated from FIG. 2, then, a challenge emerges in managing delayed-delivery flows 200, via accommodating Async traffic within spectrum 199, such that the delayed data are delivered within reasonable pre-established (e.g., pre-agreed) deadlines while maintaining the interference caused on the on-demand traffic at a low value, e.g., less than some threshold $\tau$.

Generally, in accordance with at least one embodiment of the invention, it is recognized that there are techniques for transferring background flows in a non-intrusive manner when all the links in an end-to-end path are scheduled under first-in-first out (FIFO). However, conventional arrangements do not present background transfers with proportionally fair (PF) schedulers as typically employed by base stations in cellular networks.

Figure 3:
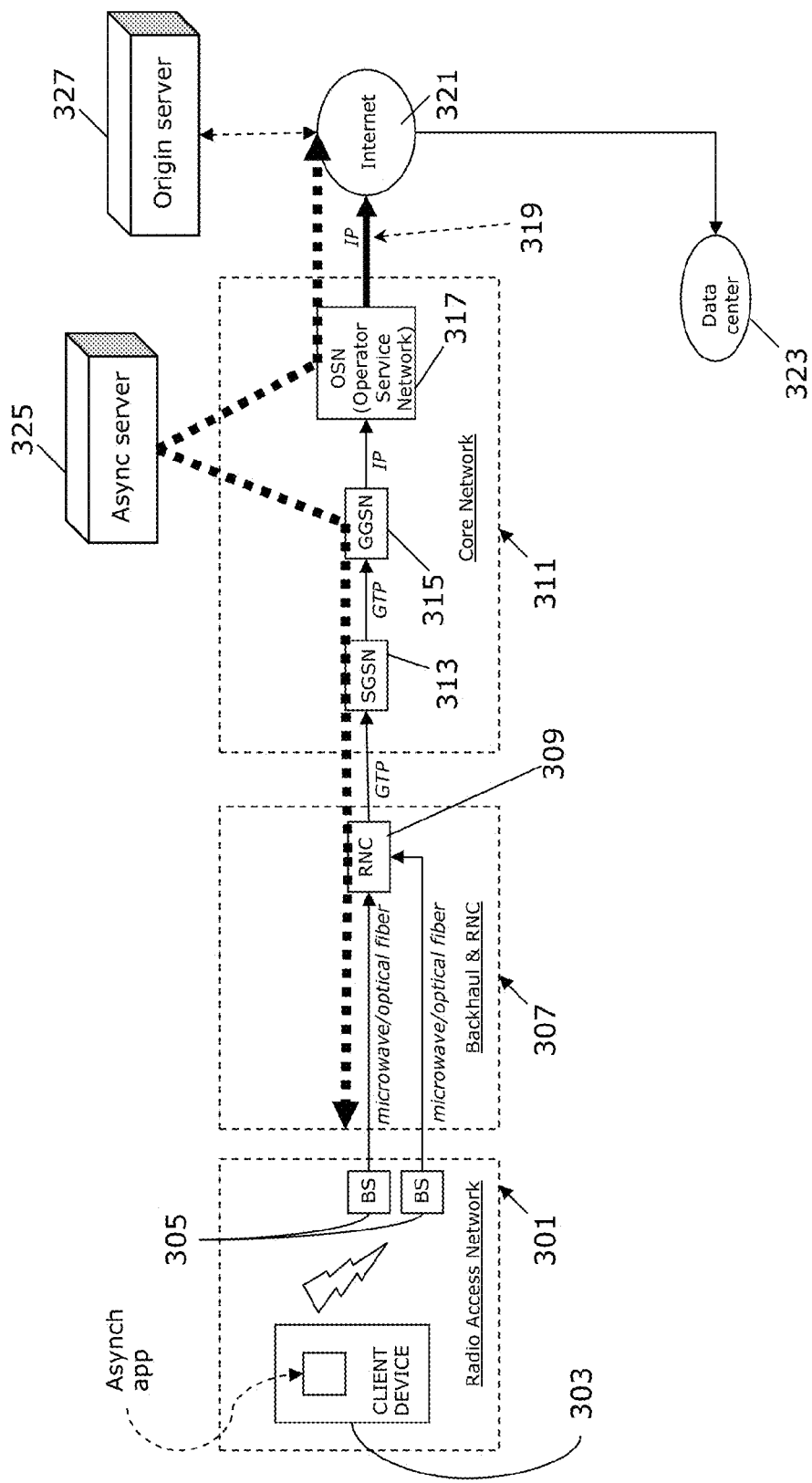
FIG. 3 schematically illustrates a general system architecture.

Accordingly, FIG. 3 schematically illustrates a general system architecture, in accordance with at least one embodiment of the invention, for facilitating delayed delivery in a context of base stations employing PF scheduling. As shown, in a radio access network 301, a client device (CD) 303, e.g., a mobile phone, is communicatively in contact with base stations (BS) 305. In a manner to be better appreciated and understood herebelow, the CD 303 includes an Async application (or "app") for use in conjunction with an Async server 325. The base stations are connected to a backhaul and RNC (Radio Network Control) portion 307, wherein a link (such as a microwave and/or optical fiber link) connects each base station with the RNC 309. The RNC 109 is connected to an SGSN (Serving GPRS [General Packet Radio Service] Support Node) 313 of a core network 311 via a GTP (GPRS tunneling protocol) link. Also included in core network 311 are a GGSN (Gateway GPRS Support Node) 315 connected via a GTP to the SGSN 313, and also to an OSN (Operator Service Network) 317 via an IP (Internet Protocol) link. For its part, the OSN 317 is connected via an external link 319 to the Internet 321, itself in communicative contact with a data center 323.

In accordance with at least one embodiment of the invention, an Async server 325 is provided to facilitate delivery scheduling for digital content. Thus, inasmuch as digital content may be accommodated at a CD 303, Async server 325 can assist in managing delivery to CD 303. Async server 325 can be deployed between GGSN 315 and OSN 317 but, alternatively, may be deployed at other locations.

In accordance with at least one embodiment of the invention, when data are requested by an Async client (e.g., via the Async application in the client device 303), the Async flows are redirected to a terminating proxy in Async server 325. The Async server will respond to the client providing one or more choices for delivery deadlines and corresponding prices. The Async client (app) serves to choose one of the deadlines suggested by Async server 325. To facilitate better scheduling, the Async server (325) may establish multiple HTTP connections to the origin server (327) that is hosting the requested content, (or the client 303 may make multiple requests as times suggested by Async server) and cache the content for delivery to the client.

Figure 4:
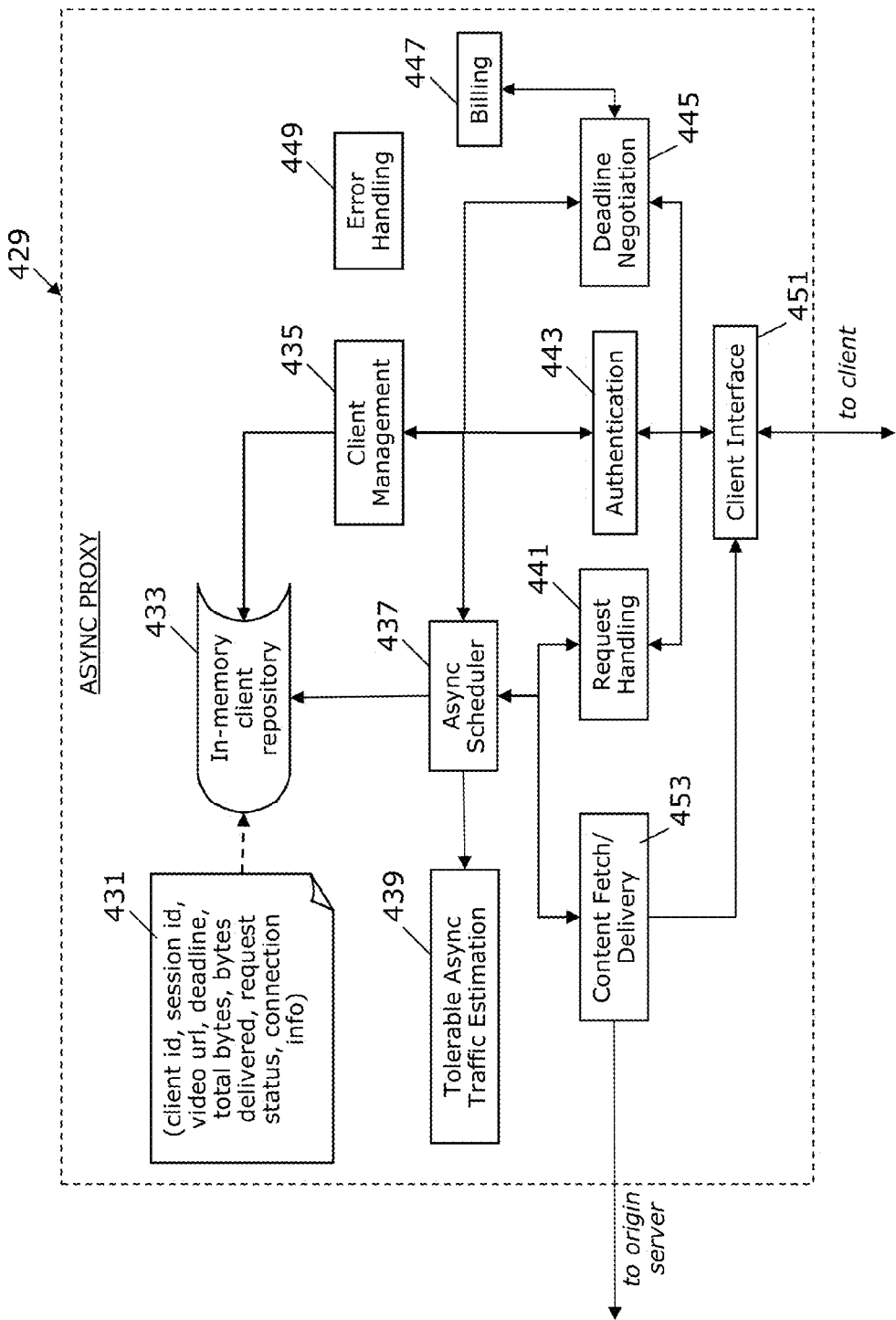
FIG. 4 schematically illustrates an Async proxy for effecting delayed delivery.

FIG. 4 schematically illustrates, in accordance with at least one embodiment of the invention, an Async proxy 429 for effecting delayed delivery, which may be housed at an Async server (e.g., as indicated at 325 in FIG. 3). As such, it can be appreciated, that network and proxy-controlled delivery helps ensure bounded interference, in that the client will not be cognizant of current network load and traffic trends, and hence, may not be able to ensure bounded interference. The Async proxy is thus responsible for controlling the progression of delayed delivery flows by undertaking several key functions. It measures currently available resources in all network base-stations, and a history of such resource availability. It keeps track of all delayed-delivery clients associated with the network. Further, it schedules delayed flows to clients according to their deadline needs and network conditions.

In accordance with at least one embodiment of the invention, the Async proxy can be located at any stage of the wireless network backhaul. Locations at different points in the hierarchy gives it access to different levels of information. Location behind the GGSN (Gateways) facilitates access to resource availability information from all network base-stations and also easy access to content servers.

Generally, in accordance with the arrangement of FIG. 4, in accordance with at least one embodiment of the invention, the proxy, in an in-memory client repository 433, maintains client specific information 431, which may include client ID, session ID, video URL, a deadline for delivery to a client, total bytes, bytes (already) delivered, request status and connection information. A client management module 435 is in connection with an Async scheduler 437 which schedules data flows in accordance with estimated values, taking into account parameters from all clients. Another module 439, for tolerable Async traffic estimation, estimates how many flows can transfer traffic simultaneously at their fair-shares at any given time, such that the interference on other demand flows is within the decided bound (see FIG. 2). Apart from other functional modules such as request handling 441, client authentication 443, billing 447 and error handling 449, a deadline negotiation module 445 serves to negotiate deadlines, and associated pricing, with a user at the client end. A client interface module 451 serves to connect with clients, while a module 453 for fetching and delivering content is in communication with the content origin server.

Generally, in accordance with at least one embodiment of the invention, an Async client (or client interested in delayed delivery) generates a download request. The Async proxy 429 then fetches URL information (e.g., file size) from the content/origin server. Relevant information such as user-class can be fetched from the local database at the Async server. Upon this, achievable deadlines are calculated along with corresponding pricing schemes for download. A list of deadlines is then proposed to the client, and the user at the client side decides whether to respond to that list. If there is a response and a deadline is chosen, the download is started, and managed according to the descriptions given later in this document. Else, if no deadline is chosen, more choices are offered to the client to the extent viable. It can be appreciated that deadlines can be proposed by the proxy keeping various factors, e.g., network conditions, a user's subscription tier, and proposed to the user client, who can either accept or reject the proposed deadlines.

Figure 5:
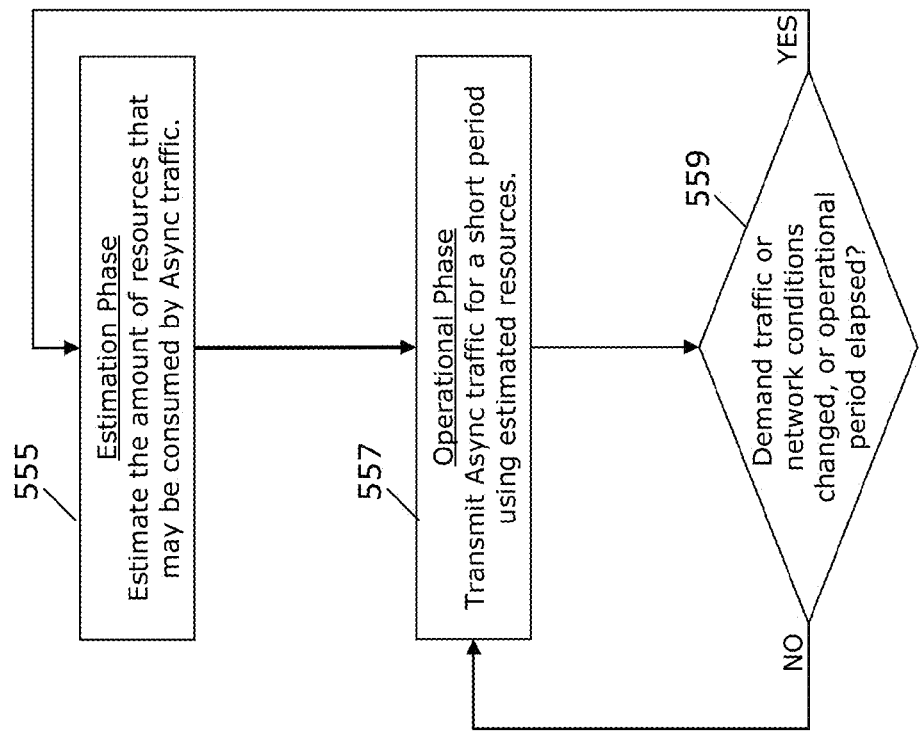
FIG. 5 schematically illustrates a general process for an Async proxy to estimate a permitted number of Async flows.

FIG. 5 schematically illustrates a general process for an Async proxy to estimate a permitted number of Async flows, in accordance with at least one embodiment of the invention. As such, the amount of resources that may be consumed by Async traffic is estimated (555) periodically, say, once every few minutes (see "tolerable" module in FIG. 4). The estimation phase 555 is followed by an operational phase 557, where Async traffic is transmitted as decided in the estimation phase 555, until the end of this period. If (559) at any point, demand traffic or network conditions change during this period, the proxy will adjust accordingly by switching the relevant Async flows "on" or "off". As such, if indeed demand traffic or network conditions change, or an operational period elapses, the process returns to estimation phase 555; else, operational phase 557 resumes.

FIG. 6 schematically illustrates a more detailed view of an estimation phase 655, in accordance with at least one embodiment of the invention. The estimation carried out thereby is presented by way of illustrative and non-restrictive example, and other protocols for estimation can certainly be carried out as warranted. As such, in accordance with the illustrative example of FIG. 6, first, any Async flows consuming less than a fair share of a base station capacity are suspended (656). If the number of Async flows receiving fair share (k) is less than 2, then 2-k Async flows are started and they are allowed to receive fair share (659). Thereafter, or if k is already greater then or equal to 2, a reference Async flow f is chosen and the bandwidth $b_2$ it receives is noted (661). One of the k non-reference Async flows is suspended, and the remaining flows are allowed to stabilize; the bandwidth $b_1$ received by f is noted (663).

Then, in the illustrative example of FIG. 6, in accordance with at least one embodiment of the invention, a quantity C, which is the base station capacity, and the number of demand flows n are determined via $b_1$ and $b_2$ as shown. (665). If (667) n is less than 1, then β, the bandwidth for Async flows, is estimated as $k*b_1$ (669). Otherwise, a quantity κ is defined (671) as $(\tau*n)/(1-\tau)$, where $\tau$ is the interference bound as discussed heretofore. If (673) $\kappa$ is greater than or equal to one, then $\beta$ is estimated (675) as $(\kappa*C)/(n+\kappa)$. Otherwise (677), $\beta$ is estimated as $(\tau*C)$.

In accordance with at least one embodiment of the invention, if, in the estimation of FIG. 6, n is less than one, then as many Async flows as needed may be allowed to progress during the subsequent operational phase. On the other hand, if $\kappa$ is greater than or equal to 1, then $\lfloor K \rfloor$ Async flows are allowed to progress. In both cases, the Async flows are permitted to receive as much throughput as they can possibly achieve. Finally, if $\kappa$ is less than 1, it should be ensured that the aggregate bandwidth received by the Async flows does not exceed $(\tau*C)$. This can be achieved by allowing just the reference flow to progress and throttling its bandwidth to $(\tau*C)$.

FIG. 7 schematically illustrates a process for ensuring a bound on interference, in accordance with at least one embodiment of the invention. As shown, it is acknowledged that almost all traffic delivered via Async flows during the estimation phase (755) could interfere with demand flows. If (779) interference caused during the estimation phase (755) exceeds the bound $\tau$, then Async traffic injected during the operation phase (757) may be lowered by the requisite amount in compensation (781).

In accordance with at least one embodiment of the invention, by way of delayed delivery scheduling, the estimation of deadlines for different flows are based on a pricing regime. When a new client arrives, the proxy computes a deadline based on factors including but not limited to the number of Async flows already accepted and their deadlines, the size of the incoming client's requested content, the client's expected channel quality, an estimate of the AB (available bandwidth) over the period of interest, and the pricing tier that the client belongs to. An immediate scheduling of flows with requests pending can then take place. Particularly, at each scheduling opportunity, the scheduler chooses k active flows with the earliest deadline, where k is the permissible number of Async flows. The unscheduled flows, if any, are requested to poll-back after a determined duration. Alternatively, the scheduler may choose k flows that see the best channel conditions. By way of governing poll-back duration, if a client's polling request cannot be satisfied within a short time, e.g., 1 minute, the client is asked to poll back after a poll-back duration of, e.g., several minutes. A poll-back duration can be recommended by the proxy to the client based on the proxy's knowledge of bandwidth history, the currently active flows, the data pending for them, and their deadlines, or self-calculated by the client based on its urgency.

As such, FIG. 8 schematically illustrates a delayed delivery client 883, in accordance with at least one embodiment of the invention; this can correspond to an application housed at a client mobile phone (e.g., as indicated at 303 in FIG. 3). By way of an associated process, the user (via an interface 885) transmits (A') a user ID to the Async proxy (via a proxy interface 887), through the medium of an authentication and deadline negotiation module 889. The proxy returns the aforementioned list of deadline/pricing options (B'). The user chooses one deadline/pricing option, which is transmitted to the proxy (C'). The client 883 then polls the proxy at predetermined intervals as discussed heretofore, and if the client 883 is scheduled for delivery at a given time then, content is pushed to the client 883 and to a download management module 891 thereof (D'). The content is delivered to an encrypted storage system 893 and then to a media player 895; the user is then notified when download is complete (E').

Figure 9:
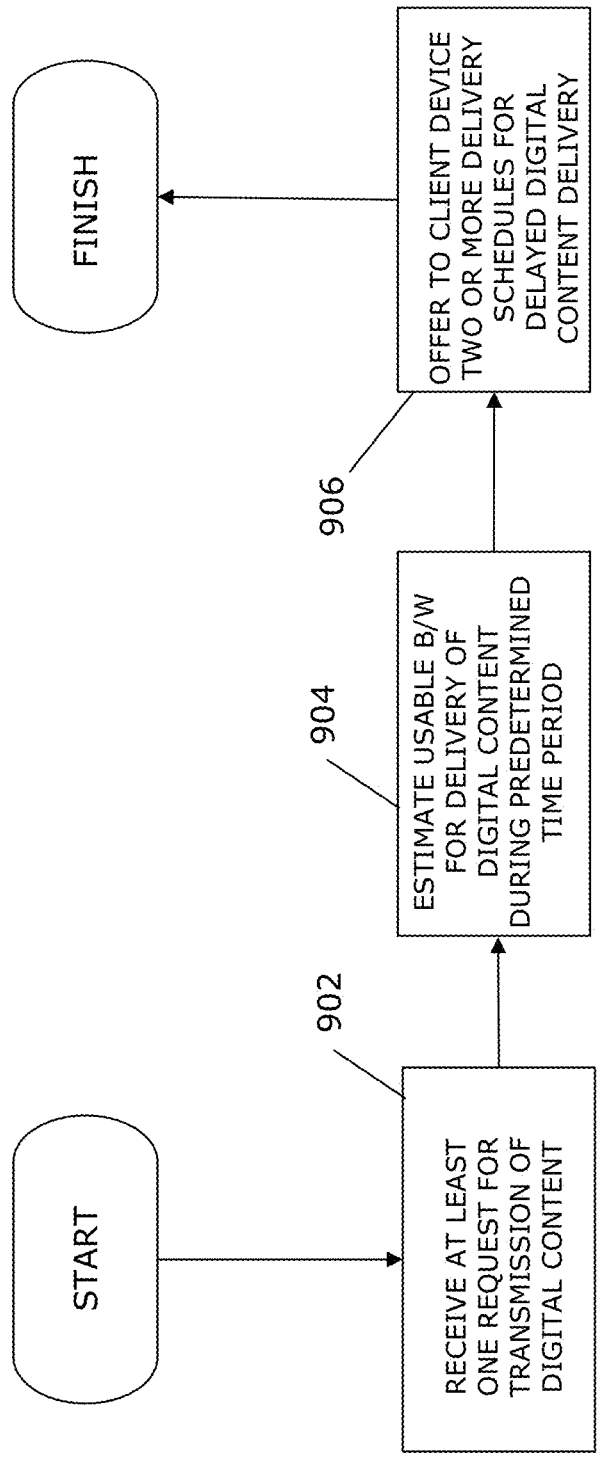
FIG. 9 sets forth a process more generally for undertaking delayed delivery of digital content.

FIG. 9 sets forth a process more generally for undertaking delayed delivery of digital content, in accordance with at least one embodiment of the invention. It should be appreciated that a process such as that broadly illustrated in FIG. 9 can be carried out on essentially any suitable computer system or set of computer systems, which may, by way of an illustrative and non-restrictive example, include a system such as that indicated at 12' in FIG. 10. In accordance with an example embodiment, most if not all of the process steps discussed with respect to FIG. 9 can be performed by way of a processing unit or units and system memory such as those indicated, respectively, at 16' and 28' in FIG. 10.

As shown in FIG. 9, in accordance with at least one embodiment of the invention, at least one request for transmission of digital content is received from a client device (902). There is estimated a usable bandwidth for delivery of the digital content during a predetermined time period (904). There is offered to the client device two or more delivery schedules for delayed digital content delivery during the predetermined time period (906).

Figure 10:
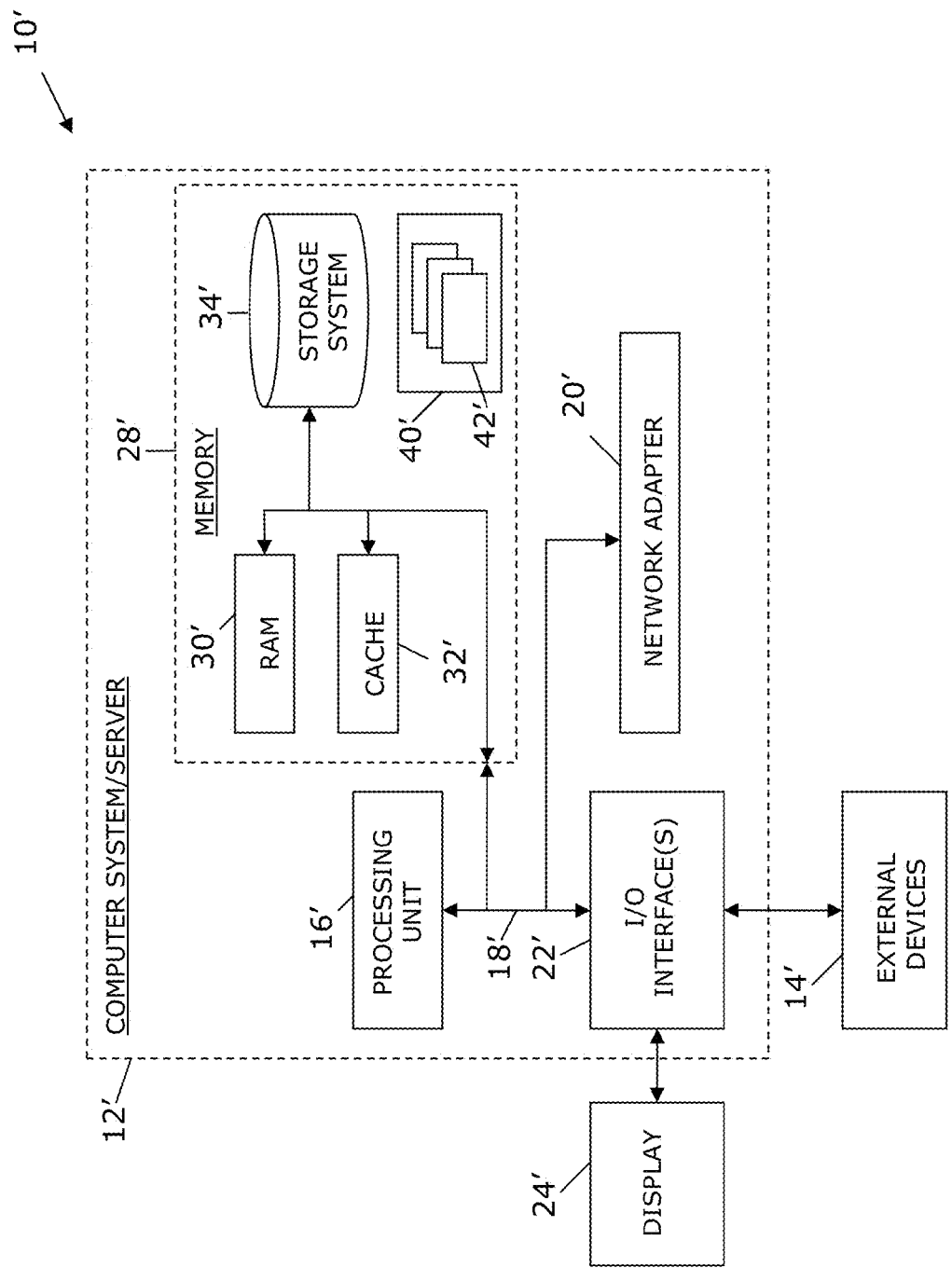
FIG. 10 illustrates a computer system.

Referring now to FIG. 10 a schematic of an example of a cloud computing node is shown. Cloud computing node 10' is only one example of a suitable cloud computing node and is not intended to suggest any limitation as to the scope of use or functionality of embodiments of the invention described herein. Regardless, cloud computing node 10' is capable of being implemented and/or performing any of the functionality set forth hereinabove. In accordance with embodiments of the invention, computing node 10' may not necessarily even be part of a cloud network but instead could be part of another type of distributed or other network, or could represent a stand-alone node. For the purposes of discussion and illustration, however, node 10' is variously referred to herein as a "cloud computing node".

In cloud computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, computer system/server 12' in cloud computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'.

Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

It should be noted that aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in at least one computer readable medium having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store, a program for use by, or in connection with, an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of at least one programming language, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture. Such an article of manufacture can include instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. An apparatus comprising:
at least one processor; and
a computer readable storage medium having computer readable program code embodied therewith and executable by the at least one processor, the computer readable program code comprising:
computer readable program code configured to receive at least one request for transmission of digital content from a client device;
computer readable program code configured to operate jointly with a fair scheduler of at least one base station of the cellular network to:
estimate a usable bandwidth for delivery of the digital content during a predetermined time period; and
offer to the client device two or more delivery schedules for delayed digital content delivery during the predetermined time period, wherein the two or more delivery schedules comprise estimated delivery deadlines for delayed digital content delivery and differing pricing associated with the estimated delivery deadlines;
computer readable program code configured to estimate a number of schedulable data flows during the pre-determined time period via transmitting one or more probes to client devices, and via incorporating network condition inputs; and
computer readable program code configured to compare results derived from the one or more probes to a predetermined interference threshold with respect to other demand flows.

2. The apparatus according to claim 1, comprising:
an asynchronous scheduling server housed in a backhaul portion of a cellular network, said asynchronous scheduling server comprising said computer readable program code configured to:
estimate a usable bandwidth for delivery of the digital content during a predetermined time period; and
offer to the client device two or more delivery schedules for delayed digital content delivery during the predetermined time period;
wherein the client device comprises an end-user device.

3. The apparatus according to claim 1, wherein the network condition inputs comprise at least one member selected from the group consisting of: channel capacity and a predetermined degree of interference with respect to other flows.

4. The apparatus according to claim 1, comprising computer readable program code configured to deliver the digital content to the client based on: the estimate of a number of schedulable data flows during the pre-determined time period; one or more pre-agreed deadlines with respect to the clients; and the network condition inputs.

5. The apparatus according to claim 4, comprising computer readable program code configured to establish a poll-back duration for a client to whom data have not been sent and to direct the client to poll-back after the established duration.

6. The apparatus according to claim 1, comprising computer readable program code configured to deliver an application to the client, the application being configured to:
provide an interface for a user to negotiate delivery deadlines and prices;
asynchronously receive data via digital content delivery;
maintain the received data and download state during receipt of digital content delivery; and
poll-back upon direction from a server that delivers the digital content.

7. A method comprising:
utilizing at least one processor to execute computer code configured to perform the steps of:
receiving at least one request for transmission of digital content from a client device;
operate jointly with a fair scheduler of at least one base station of the cellular network to:
estimate a usable bandwidth for delivery of the digital content during a predetermined time period; and
offer to the client device two or more delivery schedules for delayed digital content delivery during the predetermined time period, wherein the two or more delivery schedules comprise estimated delivery deadlines for delayed digital content delivery and differing pricing associated with the estimated delivery deadlines;
wherein to estimate comprises estimating a number of schedulable data flows during the pre-determined time period via:
transmitting one or more probes to client devices;
incorporating network condition inputs; and
comparing results derived from the one or more probes to a predetermined interference threshold with respect to other demand flows.

8. The method according to claim 7, comprising delivering the digital content to the client based on: the estimate of a number of schedulable data flows during the pre-determined time period; one or more pre-agreed deadlines with respect to the client; and the network condition inputs.

9. A computer program product comprising:
a non-transitory computer readable storage medium having computer readable program code embodied therewith, the computer readable program code comprising:

computer readable program code configured to receive at least one request for transmission of digital content from a client device;

computer readable program code configured to operate jointly with a fair scheduler of at least one base station of the cellular network to:
estimate a usable bandwidth for delivery of the digital content during a predetermined time period; and
offer to the client device two or more delivery schedules for delayed digital content delivery during the predetermined time period, wherein the two or more delivery schedules comprise estimated delivery deadlines for delayed digital content delivery and differing pricing associated with the estimated delivery deadlines;

computer readable program code configured to estimate a number of schedulable data flows during the pre-determined time period via transmitting one or more probes to client devices, and via incorporating network condition inputs; and computer readable program code configured to compare results derived from the one or more probes to a predetermined interference threshold with respect to other demand flows.

10. A method comprising:
operating jointly with a fair scheduler of at least one base station of the cellular network to:
(i) interact with a plurality of clients;
(ii) estimate usable bandwidth over a predetermined time period;
wherein to estimate comprises estimating a number of schedulable data flows during the pre-determined time period via:
transmitting one or more probes to devices of the plurality of clients;
incorporating network condition inputs; and
comparing results derived from the one or more probes to a predetermined interference threshold with respect to other demand flows: and
(iii) with respect to at least one of the clients, and based on the estimated usable bandwidth:
estimate delivery deadlines for delayed digital content delivery;
determine pricing associated with each of the deadlines;
present the estimated delivery deadlines and associated pricing to the at least one client; and
perform at least one of:
accepting from the at least one client a selection of a delivery deadline and its associated pricing; and
negotiating, with the at least one client, at least one newly proposed delivery deadline and associated pricing.

\* \* \* \* \*